United States Patent Office 3,310,556
Patented Mar. 21, 1967

3,310,556
DIOXAZINE PIGMENTS
Jost von der Crone and André Pugin, Riehen, Switzerland, assignors to J. R. Geigy A.G., Basel, Switzerland
No Drawing. Filed Feb. 2, 1965, Ser. No. 429,927
Claims priority, application Switzerland, Feb. 7, 1964,
1,484/64
12 Claims. (Cl. 260—246)

The present invention concerns new dyestuffs of the dioxazine series, processes for the production thereof, their use for the dyeing and pigmenting of organic materials and, as industrial products, the materials dyed therewith.

It has been found that new, difficultly soluble, strongly colored dioxazine dyestuffs are obtained by condensing a compound free from sulfonic acid groups, of the formula

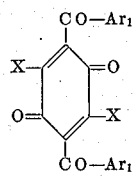

(I)

wherein X represents hydrogen or halogen and $Ar_1$ represents an aromatic radical as defined further below, by methods known per se, with an amine free from sulfonic acid groups, of the formula

(II)

wherein $Ar_2$ represents a divalent aromatic radical as defined hereinafter, preferably an ortho- phenylene radical, which contains, in ortho-position to the —$NH_2$ group, the replaceable substituent Z which represents either a hydrogen atom or an alkoxy, cycloalkoxy, aralkoxy or aryloxy group, especially a lower alkoxy group such as the methoxy, ethoxy, propoxy, isopropoxy or n-, sec. or tert. butoxy group, or an aryloxy group such as the phenoxy group or a methylphenoxy or chlorophenoxy group, and which radical $Ar_2$ can be further non-ionogenically substituted as described further below, to form a triphenodioxazine pigment of the formula

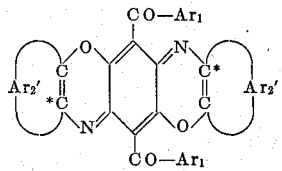

(III)

wherein $Ar_1$ has the same meaning as in Formula I, and each $Ar_2'$ together with the carbon atoms to which it is attached, constitutes an arylene radical corresponding to that of $Ar_2$.

X in Formula I is preferably halogen, particularly chlorine or bromine.

Both $Ar_1$ in Formulas I and III represent identical radicals of the benzene series, namely, phenyl, fluorophenyl, chlorophenyl, bromophenyl, lower alkylphenyl, lower alkoxyphenyl, diphenyl, phenoxy-phenyl or halogenophenoxyphenyl, especially chlorophenoxyphenyl.

Both

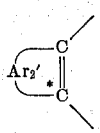

groups in Formula III represent identical divalent radicals, of the benzene, naphthalene, furan, or 1,4-dioxin series.

More in detail, $Ar_2$ and, correspondingly,

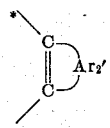

represent unsubstituted o-phenylene, or o-phenylene substituted as follows:

By lower alkyl, lower alkoxy, hydroxy-lower alkoxy, phenyl, halogenophenyl, lower alkoxy-phenyl, aminophenyl, cyanophenyl, benzoylamino, halogenobenzoylamino, lower alkylbenzoylamino-phenyl, nitrobenzoylamino-phenyl, lower alkoxybenzoylamino-phenyl, benzyloxy, halogenobenzyloxy, lower alkylbenzyloxy, phenoxy, halogenophenoxy, lower alkylphenoxy, lower alkoxyphenoxy, phenylthio, lower alkylphenylthio, fluorine, nitro, trifluoromethyl, amino, carbamyl, sulfamyl, mono-N-lower alkyl-carbamyl, mono-N-lower alkyl-sulfamyl, mono - N - phenyl - carbamyl, mono-N-phenyl-sulfamyl, mono-N-(lower alkylphenyl) - sulfamyl, mono-N-halogenophenyl-sulfamyl, mono-N-(lower alkoxyphenyl)-sulfamyl, mono-N-(lower alkyl-phenyl)-carbamyl, mono-N-(halogenophenyl)-carbamyl, mono - N - (lower alkoxyphenyl)-carbamyl, lower alkoxycarbonyl, lower alkylsulfonyl, phenylsulfonyl, benzoyl, halogenobenzoyl, lower alkyl-benzoyl, lower alkoxy-benzoyl, lower alkanoylamino, benzoylamino, halogenobenzoylamino, lower alkyl- or lower alkoxy-benzoylamino, lower alkoxy-carbonylamino, non - fiber - reactive s-triazinylamino substituents, especially 4,6 - diphenyl - 1,3,5 - triazinyl-(2)-amino, or $Ar_2$ represents 1,2-naphthalene, in which case

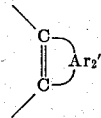

represents one of the radicals

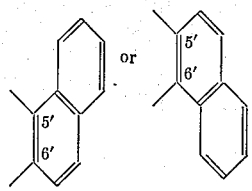

or $Ar_2$ represents benzofuryl-phenylene or benzodioxinylphenylene, in which cases the grouping

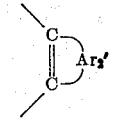

represents the radicals

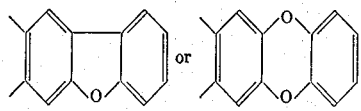

respectively.

In a second class of compounds according to the invention which are of the same general formula, but have different substituents in the two terminal benzene rings of the triphenodioxazine nucleus, the grouping

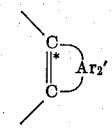

represents a radical of the formula

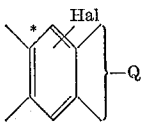

wherein Hal represents a halogen atom of one of the atomic numbers 17 and 35, and Q represents amino, lower alkanoylamino, benzoylamino, lower alkylbenzoylamino, halogenobenzoylamino wherein halogeno means halogen of one of the atomic numbers 17 and 35, lower alkoxybenzoylamino, lower alkoxy, phenoxy, halogenophenoxy, lower alkylphenoxy, lower alkoxyphenoxy or N-phenylcarbamyl.

Unless expressely stated otherwise "Hal" and "halogeno" as used in this specification and the appended claims stands for halogen of one of the atomic numbers 17 and 35, and "lower" used herein in connection with an aliphatic radical means that such radical has not more than 4 carbon atoms.

The greater part of the starting materials of Formula I used according to the invention are new.

They are obtained, for example, by oxidising corresponding 1,4-dihydroxy-2,5-bis-aroyl-benzene compounds to the 1,4-benzoquinones. For starting materials in which X is hydrogen, advantageously nitric acid or silver oxide is used as oxidising agent. On the other hand, if X is a halogen atom, particularly chlorine or bromine, then the elementary halogen in glacial acetic acid or in chloroform is used as oxidising agent, the ring being substituted by halogen in the same process.

The 1,4-dihydroxy-2,5-bis-aroyl-benzene compounds are obtained by condensing, according to Friedel-Crafts, a 1,4-di-acyloxybenzene-2,5-bis-carboxylic acid chloride with 2 equivalents of a benzene substance corresponding to $Ar_1$ and then saponifying the acyloxy groups to hydroxyl groups. For this condensation, advantageously benzene substances corresponding to $Ar_1$ are used which are easily accessible for the Friedel-Crafts reaction, e.g. benzene, toluene, m-xylene, anisol, etc; generally good yields of the desired intermediate products are obtained.

The condensation according to the invention of a compound of Formula I with a compound of Formula II to form the dioxazine dyestuff of Formula III is generally performed by heating, preferably in an inert organic solvent, if necessary in the presence of auxiliaries such as buffering agents or acid condensing agents.

Suitable inert organic solvents are, e.g. unhalogenated or halogenated and/or nitrated aromatic hydrocarbons of the benzene or naphthalene series, e.g. xylenes, di- and tri-chlorobenzenes, nitrobenzene, naphthalene or chloronaphthalenes; under certain conditions, which will be described below, also alcohols such as ethanol, propanol, butanol or ethylene glycol or esters thereof, e.g. the acetates, benzoates or phthalates of low alkanols and also low fatty acids, e.g. acetic acid, can be used.

The choice of auxiliaries and of reaction conditions depends on the starting materials used.

Thus for example, a 1,4-benzoquinone of Formula I wherein X=halogen is preferably reacted with an amine of general Formula II wherein $Ar_2$ is an aromatic radical containing in o-position to the $H_2N$-group an ether group which can easily be replaced, e.g. an optionally ring-substituted phenoxy group, in an inert organic solvent and, optionally, in the presence of an acid buffering agent, at temperatures of from 100 to 300° C., preferably from 140 to 260° C. Suitable acid buffering agents are, e.g. alkali hydroxides such as sodium hydroxide, alkaline earth oxides such as magnesium oxide, alkaline earth hydroxides, alkali carbonates, alkali metal salts of low fatty acids, in the latter case, e.g. sodium acetate, or teriary bases such as pyridine. Also the addition of acid condensing agents can be of advantage for the closure of the oxazine ring.

The reaction of the same 1,4-benzoquinone with an amine of Formula II wherein $Ar_2$ is a negatively substituted aromatic radical which is also substituted in o-position to the $H_2N$-group by a hydroxyl group, is preferably performed in an inert organic solvent, e.g. in a low alkanol such as in ethanol, or in a low fatty acid such as acetic acid, at low temperatures, for example from 40 to 100° C.

The condensation of the above mentioned 1,4-benzoquinone of Formula I wherein X is halogen, with an amine of Formula II wherein $Ar_2$ is an aromatic radical not substituted in o-position to the $H_2N$-group, is preferably performed in an organic solvent in the presence of an oxidising agent as well as, optionally, in the presence of an acid condensing agent. Suitable oxidising agents are air oxygen and also aromatic nitro compounds, i.e. nitrobenzene or nitrobenzene sulphonic acid. Suitable acid condensing agents are in particular the acid halides of carboxylic or sulphonic acids such as benzoyl chloride, methylbenzoyl or chlorobenzoyl chloride or benzene sulphonic acid or 4-methylbenzene sulphonic acid chloride, also sulphur and phosphorus chlorides such as thionyl chloride or phosphorus pentachloride, or also acid hydrolysing metal chlorides, e.g. aluminium chloride, iron chloride or zinc chloride. In this reaction, metal chlorides are advantageously used in the presence of tertiary organic nitrogen bases such as pyridine.

If a 1,4-benzoquinone of Formula I wherein X is hydrogen is used in the reactions mentioned, then the use of an oxidising agent, e.g. nitrobenzene or nitrobenzene sulphonic acid is recommended. Otherwise the reaction conditions are the same as when a 1,4-benzoquinone wherein X is halogen is used.

If amines of Formula II wherein $Ar_2$ contains an ether group or hydrogen in o-position to the $H_2N$-group are used, then the condensation is advantageously performed in two steps. In the first step, the 2,5-bis-arylamino-3,6-bis-aroyl-1,4-benzoquinone is produced of the Formula IV:

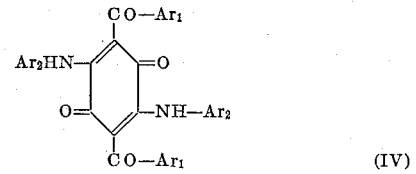

(IV)

This is done in the known manner, e.g. by heating the reaction partners in a low alcohol such as ethanol. In the second step, the ring of the 2,5-bis-arylamino-3,6-bis-aroyl-1,4-benzoquinone of Formula IV is closed to form the dioxazine dyestuff of Formula III. Ring closure is attained advantageously by heating the compound of Formula IV in an inert organic solvent, optionally in the presence of an agent giving off acid, to 100 to 300° C., preferably to 140 to 200° C.

However, the reaction to produce 2,5-bis-arylamino-3,6-bis-aroyl-1,4-benzoquinone and ring closure in the latter to form the dioxazine dyestuff of Formula III can also be performed in one step.

Dianilo compounds of Formula IV wherein $Ar_2$ is a 4-acylaminophenyl radical containing an ether group in the 2- and 5-position, can be condensed in acid, i.e. in concentrated inorganic oxygen acids such as sulphuric acid, even cold, to form the corresponding triphenodioxazine dyestuff of Formula III. In many cases, the acylamino groups are also saponified to amino groups.

The possibility should also be noted that in triphenodioxazine dyestuffs containing acylamino groups according to the invention, the acylamino group can be saponified after the oxazine ring has been closed, in which case, after acyl radicals have been split off, other carboxylic acid radicals can be introduced if desired.

A modification of the process according to the invention for the production of triphenodioxazine dyestuffs of Formula III consists in condensing, according to Friedel-Crafts, a compound of the Formula V

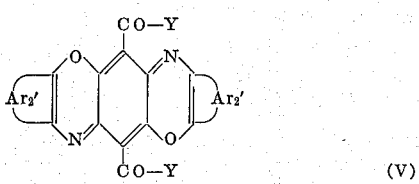

wherein Y is chlorine or bromine and $Ar_2'$ has the meaning given in Formula III, with a benzene substance corresponding to $Ar_1$.

The dioxazine-9,10-dicarboxylic acid dihalides of Formula V used therefor as starting materials are obtained, for example, by reacting a 2,5-dihalogen-1,4-benzoquinone-3,6-dicarboxylic acid diester, in particular the dilow-alkyl ester, with the amine $H_2N$—$Ar_2$ to form the corresponding triphenodioxazine - 9,10 - dicarboxylic acid ester, saponifying this triphenodioxazine dicarboxylic acid ester to the triphenodioxazine-9,10-dicarboxylic acid and halogenating the latter with a halogenating agent, e.g. with an inorganic acid halide such as a phosphorus halide or thionyl chloride.

The condensation of the dioxazine-9,10-dicarboxylic acid halide of Formula V with the benzene substance corresponding to $Ar_1$ is preferably performed in an excess of the latter and in the presence of a Friedel-Crafts catalyst, in particular in the presence of aluminium chloride and, if necessary, at a raised temperature. Advantageously compounds which easily react in the Friedel-Crafts reaction are used as benzene substances corresponding to $Ar_1$.

High yields of dioxazine compounds of Formula III according to the invention are obtained, particularly when they are produced by condensation of a 1,4-benzoquinone of Formula I in which X is halogen with an amine of Formula II. They generally almost completely crystallise out, even in the hot reaction mixture, in very pure form. They have the characteristic properties of dioxazine dyestuffs, for example, they dissolve with a blue colour in concentrated sulfuric acid and sometimes the crystals have a metallic shimmer. They are isolated by filtration and further purified by washing the filter residue with organic solvents and aqueous acids or bases.

Because of their difficult solubility in organic solvents, the finely dispersed dioxazine dyestuffs according to the invention of Formula III can be used as pigment dyestuffs. They are converted into a finely dispersed form, for example, by dissolving in concentrated acid and precipitated from the solutions by turbulent dilution with water. Examples of solvents are concentrated sulphuric acid or polyphosphoric acids or aliphatic carboxylic acids such as di- and tri-chloroacetic acid. Fine distribution can also be obtained, however, by milling in the presence of inorganic or organic salts which can later be removed by solvents, optionally in the presence of organic solvents, acids or bases as milling auxiliaries.

Organic solvents which are solid or liquid at room temperature can be used. For example, the pigment dyestuffs which have been isolated from the reaction mixture and dried are milled with dehydrated calcium chloride or with sodium sulphate or sodium chloride in the presence of aliphatic or aromatic, optionally chlorinated and/or nitrated hydrocarbons such as cyclohexane, benzene, toluene, naphthalene, mono-, di- or tri-chlorobenzene, tetrachloroethane or nitrobenzene, aliphatic ketones such as, e.g. acetone, or aliphatic monoalcohols e.g. methanol, ethanol, methoxyethanol or ethoxyethanol, or nitrogen compounds such as dimethyl aniline or diethyl aniline, quinoline or dimethyl formamide. In some cases the pigments can be finished by milling with organic solvents alone without the addition of salts. After milling, it is advantageous to remove the auxiliaries; inorganic salts, for example, are dissolved with water and organic auxiliaries may be removed by distillation or with steam.

In this way, finely dispersed organe, red, Bordeaux coloured blue and violet pigments are obtained of remarkable colour strength and purity which, compared with the crude products, have a softer texture.

The new dioxazine dyestuffs can be used for the pigmenting of organic materials, in particular, of varnishes, rubber, lacquers, e.g. stoving lacquer or nitro lacquer, and plastics such as polyvinyl chloride, polyethylene or propylene. The dyeings attained therewith are distinguished by great colour strength and also by good fastness to solvents, cross lacquering, migration, rubbing, heat and light. The good fastness to solvents, cross lacquering and migration is apparent particularly with 2,6-diacylamino-9,10-dibenzoyltriphenodioxazines,
2,6-diacylamino-3,7-dialkoxy-9,10-dibenzoyltriphenodioxazines,
2,6-diacylamino-3,7-dichloro-9,10-dibenzoyltriphenodioxazines,
2,6-diacylamino-3,7-dichloro-9,10-dibenzoyltriphenodioxazines,
3,7-di-(N-arylcarbamyl)-9,10-dibenzoyltriphenodiaoxazines and, in particular, with the corresponding 9,10-dichlorobenzoyltriphenodioxazines. The new triphenodioxazines are also very suitable for the production of printing inks for paper printing as well as for the colouring of viscose and cellulose material in the mass. The prints attained with these pigments are distinguished by pure orange, red, Bordeaux-coloured and violet shades of very good colour strength as well as by good fastness to light. The purity of the shade and high fastness to light of the 2,6-dialkoxy-9,10-dibenzoyltriphenodioxazines,
2,6-dialkoxy-1,5-dichloro-9,10-dibenzoyltriphenodioxazines and
2,6-diaryloxy-9,10-dibenzoyltriphenodioxazines and of the corresponding 9,10-dialkylbenzoyltriphenodioxazines are remarkable and are often even superior to those of the known lakes of triphenylmethane pigments.

Further details can be seen from the following examples. The temperature are given therein in degrees centigrade.

EXAMPLE 1

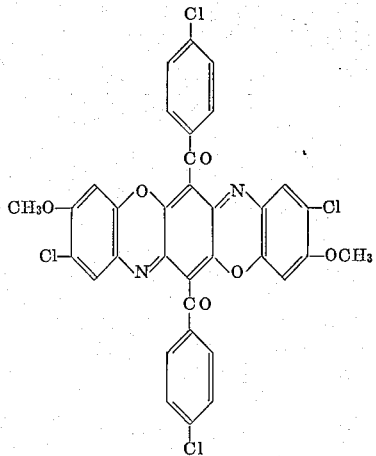

5.45 g. of 2,5-dibromo-3,6-di-(4'-chlorobenzyl)-1,4-benzoquinone, 4.2 g. of 1-amino-2,4-dimethoxy-5-chlorobenzene and 0.44 g. of magnesium oxide in 100 ml. of ethanol are boiled while stirring. After 5 hours the reaction mixture is filtered hot and the residue is washed with alcohol and water. After drying, 7.5 g. of red-brown coloured 2,5-bis-(2',4'-dimethoxy-5'-chlorophenylamino)-3,6-di-(4'-chlorobenzoyl)-1,4-benzoquinone are obtained. The dianil compound obtained, in 70 ml. of trichlorobenzene, is boiled with 2 ml. of benzoyl chloride. The triphenodioxazine has completely formed after 1½ hours. It is filtered off from the reaction mixture at 100° and washed with alcohol and water. After drying, 5.6 g. of triphenodioxazine dyestuff of the above formula are obtained in the form of needles which have a metallic shimmer. The crystals dissolve in sulphuric acid with a blue colour.

To attain a fine distribution of the crystals, the dyestuff must be milled with sodium chloride or calcium chloride in the presence of a small amount of a petroleum fraction boiling at 180 to 200°. After removing the salt with water and filtering off the solvent, a pigment dyestuff is obtained which, as printing ink for paper printing, has a blueish red shade of high purity and colour strength. If, instead of the 5.45 g. of 2,5-dibromo-3,6-di-(4'-chlorobenzoyl)-1,4-benzoquinone, the corresponding amounts of the 1,4-benzoquinones given in the following Table I are used, then with otherwise the same procedure, similarly pure and strongly coloured triphenodioxazine dyestuffs are obtained having the shades given in Column 3 of the table.

TABLE I

| No. | 1,4-benzoquinone | Shade in printing ink |
|---|---|---|
| 2 | 2,5-dibromo-3,6-di-(3',4'-dimethylbenzoyl)-1,4-benzoquinone. | Bluish red. |
| 3 | 2,5-dibromo-3,6-di-(2',4'-dimethylbenzoyl)-1,4-benzoquinone. | Do. |
| 4 | 2,5-dibromo-3,6-di-(4'-methylbenzoyl)-1,4-benzoquinone. | Do. |
| 5 | 2,5-dibromo-3,6-di-(2',4'-dichlorobenzoyl)-1,4-benzoquinone. | Do. |
| 6 | 2,5-dibromo-3,6-di-(3',4'-dichlorobenzoyl)-1,4-benzoquinone. | Do. |
| 7 | 2,5-dibromo-3,6-di-(4'-methoxybenzoyl)-1,4-benzoquinone. | Violet. |
| 8 | 2,5-dibromo-3,6-di-(3'-chloro-4'-methoxybenzoyl)-1,4-benzoquinone. | Do. |
| 9 | 2,5-dibromo-3,6-di-(4'-bromobenzoyl)-1,4-benzoquinone. | Blueish red. |
| 10 | 2,5-dibromo-3,6-di-(4'-fluorobenzoyl)-1,4-benzoquinone. | Do. |
| 11 | 2,5-dibromo-3,6-di-(4'-phenoxybenzoyl)-1,4-benzoquinone. | Violet. |

The 2,5-dibromo-3,6-di-(4'-chlorobenzoyl)-1,4-benzoquinone used according to the invention is obtained by brominating 2,5-di-(4'-chlorobenzoyl)-1,4-hydroquinone, (M.P. 265–267°) with elementary bromine in boiling chloroform and afterwards oxidising with nitric acid. The 1,4-benzoquinones shown in Table I are produced in the same way. These 1,4-benzoquinones are pale yellow, difficulty soluble compounds having a high melting point.

EXAMPLE 12

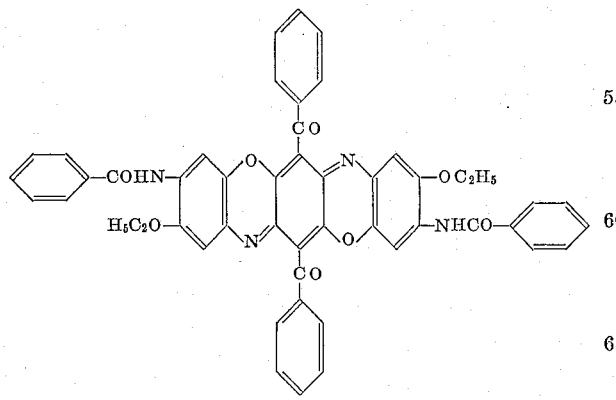

7.7 g. of 2,5-dichloro-3,6-dibenzoyl-1,4-benzoquinone, 12.0 g. of 1-amino-2,5-diethoxy-4-benzoylaminobenzene and 0.9 g. of magnesium oxide in 200 ml. of ethanol are boiled for 6 hours. The 2,5-bis-(2'5'-diethoxy-4'-benzoylamino-phenylamino)-3,6-dibenzoyl-1,4-benzoquinone formed is filtered off hot and washed with alcohol and water. After drying, 17.4 g. of a dark brown coloured product are obtained.

The ring of the dianil obtained is closed to form the triphenodioxazine by heating in 200 ml. of 1-chloronaphthalene. After refluxing for 2 hours under atmospheric pressure, the dioxazine formation is complete. The triphenodioxazine is filtered off hot and washed with acetone and water. After drying, 13.6 g. of triphenodioxazine dyestuff of the above formula are obtained in the form of green coloured crystals having a metallic shimmer. After milling the crystals with calcium chloride and working up the milled product in the usual way, a finely dispersed violent pigment dyestuff is obtained. Lacquer colourings of good colour strength are obtained therewith and they have very good fastness to cross lacquering and heat.

The 2,5 - dichloro - 3,6 - dibenzoyl - 1,4-benzoquinone used as starting material is obtained by chlorinating 2,5-dibenzoyl hydroquinone at room temperature with elementary chlorine in chloroform and afterwards oxidising with excess chlorine in ethanol. It is yellow coloured and melts at 303 to 305°.

If the 12.0 g. of 1-amino-2,5-diethoxy-4-benzoylaminobenzene are replaced by equimolar amounts of an amine mentioned in the following Table II, then with otherwise the same procedure, similar fast triphenodioxazine dyestuffs are obtained which have the shades given in Column 3 of the table.

TABLE II

| No. | Amine ($Ar_2$—$NH_2$) | Shade in lacquer |
|---|---|---|
| 13 | 1-amino-2,5-diethoxy-4-(4'-chlorobenzoylamino)-benzene. | Blue. |
| 14 | 1-amino-2,5-diethoxy-4(4'-methylbenzoylamino)-benzene. | Do. |
| 15 | 1-amino-2,5-diethoxy-4-(3',4'-dimethylbenzoylamino)-benzene. | Do. |
| 16 | 1-amino-2,5-diethoxy-4-acetylamino-benzene | Violet. |
| 17 | 1-amino-2,5-diethoxy-4-carbomethoxyaminobenzene | Do. |
| 18 | 1-amino-2,5-dimethoxy-4-benzoylamino-benzene | Do. |
| 19 | 1-amino-2,5-dimethoxy-4-(4'-chlorobenzoylamino)-benzene. | Blue. |
| 20 | 1-amino-2,5-dimethoxy-4-(2'-chlorobenzoylamino)-benzene. | Blueish violet. |
| 21 | 1-amino-2,5-dimethoxy-4-(2',4'-dichlorobenzoylamino)-benzene. | Violet. |
| 22 | 1-amino-2,5-dimethoxy-4-propionylaminobenzene | Do. |
| 23 | 1-amino-2,5-dimethoxy-4-[4',6'-diphenyl-1',3',5'-triazinyl-(2')-amino]-benzene. | Do. |

EXAMPLE 24

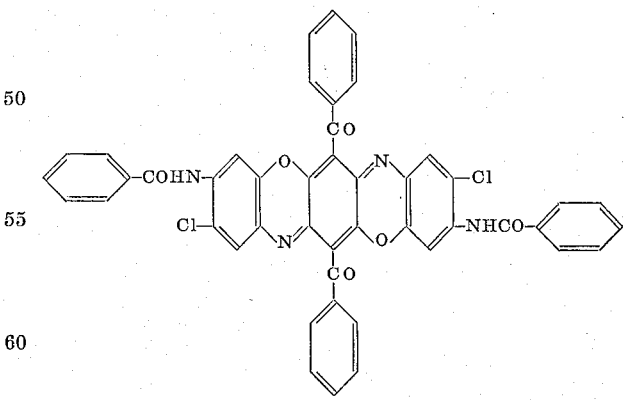

If, in Example 12, the 12.0 g. of 1-amino-2,5-diethoxy-4-benzoylamino-benzene are replaced by 15.0 g. of 1-amino - 2-phenoxy-4-benzoylamino-5-chlorobenzene and otherwise the procedure given in Example 12 is followed, then 12.8 g. of triphenodioxazine dyestuff of the above formula are obtained in the form of brown red needles which, after milling with $CaCl_2$, yield a reddish blue pigment dyestuff of a good colour strength having excellent fastness to migration, cross lacquering, heat and light.

16.0 g. of the triphenodioxazine dyestuff are added to 250 ml. of concentrated sulphuric acid. A deep blue solution is formed. After stirring for 20 hours at room temperature, the solution is poured into 2000 ml. of hot water while stirring vigorously whereupon the hydrolised diaminodioxazine dyestuff precipitates in the form of blue flakes. The precipitate is filtered off under suction and washed with aqueous ammonia. 11.5 g. of the dyestuff of the formula

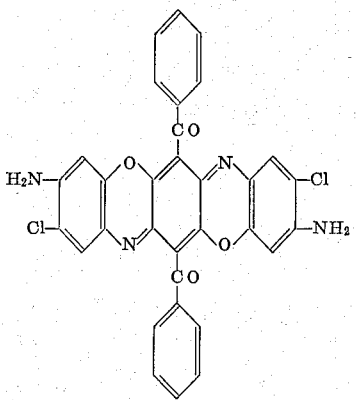

are obtained.

It is a blue pigment dyestuff of excellent purity and high grade fastness to migration, cross lacquering and light.

If in this example, the 15.0 g. of 1-amino-2-phenoxy-4-benzoylamino-5-chlorobenzene are replaced by the equivalent amount of an amine of the formula

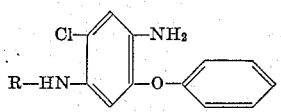

wherein R has the meaning given in Column 2 of the following Table III, and otherwise the same procedure is followed as described in this example, then similar valuable dyestuffs are obtained the shades of which in polyvinyl chloride sheets are given in Column 3 of this table.

TABLE III

| No. | R | Shade in polyvinyl chloride sheets |
|---|---|---|
| 25 | —COCH₃ | Red. |
| 26 | —CO—〈Cl,Cl〉 | Bordeaux. |
| 27 | —CO—〈Cl〉 | Violet. |
| 28 | —CO—〈OCH₃〉 | Blue. |

EXAMPLE 29

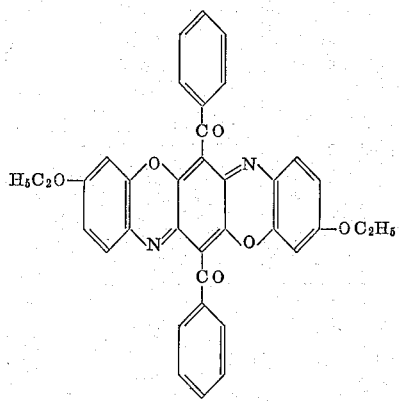

If in Example 1 the 5.45 g. of 2,5-dibromo-3,6-di-(4'-chlorobenzoyl)-1,4-benzoquinone are replaced by 4.8 g. of 2,5-dibromo-3,6-dibenzoyl-1,4-benzoquinone and the 4.2 g. of 1-amino-2,4-dimethoxy-5-chlorobenzene are replaced by 5.0 g. of 1-amino-2,4-diethoxybenzene and otherwise the procedure given in Example 1 is followed, then 3.8 g. of triphenodioxazine dyestuff are obtained in the form of crystals which have a metallic shimmer. After milling these crystals with CaCl₂, a pigment dyestuff is obtained with which prints can be attained. These prints have a very excellently pure reddish violet shade of good colour strength and, in addition, high grade fastness to light.

If, instead of the 5.0 g. of 1-amino-2,4-diethoxybenzene, equimolar amounts of the amines given in the following Table IV are used, then with otherwise the same procedure, strongly coloured pigments are obtained which have the shades given in Column 3 of the table:

TABLE IV

| No. | Amine (Ar₂—NH₂) | Shade as printing ink for paper printing |
|---|---|---|
| 30 | 1-amino-2,-dimethoxybenzene | Bluish red. |
| 31 | 1-amino-2-methoxybenzene | Orange. |
| 32 | 1-amino-2,4-dimethoxy-3-chlorobenzene | Bluish red. |
| 33 | 1-amino-2-methoxy-5-chlorobenzene | Orange. |
| 34 | 1-amino-2,5-diethoxybenzene | Violet. |
| 35 | 1-amino-2-methoxy-5-benzoylbenzene | Red. |

If, in Examples 29 to 32, the 4.8 g. of 2,5-dibromo-3,6-dibenzoyl-1,4-benzoquinone are replaced by 5.3 g. of 2,5-dibromo - 3,6 - di-(2',5'-dimethylbenzoyl)-1,4-benzoquinone, then with otherwise the same procedure, similar brilliant, strongly coloured pigments are obtained.

2,5 - dibromo - 3,6-di-(2',5'-dimethylbenzoyl)-1,4-benzoquinone is obtained by brominating 2,5-di-(2',5'-dimethylbenzoyl) - 1,4 - hydroquinone (M.P.=191–194°) and subsequently oxidising with nitric acid.

The 2,5 - dibromo-3,6-di-(2',5'-dimethylbenzoyl)-1,4-benzoquinone is pale yellow coloured and melts at 240°.

EXAMPLE 36

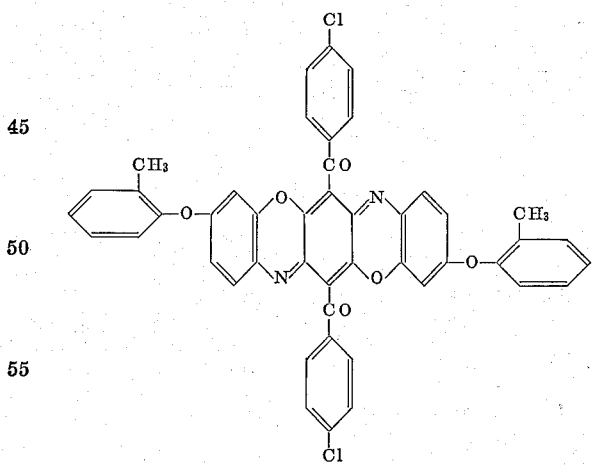

10.9 g. of 2,5-dibromo-3,6-di-(4'-chlorobenzoyl)-1,4-benzoquinone, 14.6 g. of 1-amino-2,4-di-(2'-methylphenoxy)-benzene and 6.6 g. of anhydrous sodium acetate are heated for 2 hours at 200 to 210° in 150 ml. of 1-chloronaphthalene while stirring. The precipitate formed is filtered off under suction and washed, first with ethanol, then with water, then with a mixture of ethanol and dilute sodium hydroxide solution and finally again with water, and dried. 14.3 g. of a red-brown, crystalline product of the above formula are obtained. On milling this product with CaCl₂, a red pigment of great colour strength and good fastness to light is obtained.

If the 14.6 g. of 1-amino-2,4-di-(2'-methylphenoxy)-benzene are replaced by equivalent amounts of one of the amines given in the following Table V and otherwise the procedure given in the example is followed, then triphenodioxazine dyestuffs are obtained which have similar properties and the shades described in column 3.

TABLE V

| No. | Amine (AR₂—NH₂) | Shade as printing paste |
|---|---|---|
| 37 | 1-amino-2,4-di-(4'-chlorophenoxy)-benzene | Bluish red. |
| 38 | 1-amino-2,4-diphenoxy-benzene | Red. |
| 39 | 1-amino-2,4-di-(4'-methylphenoxy)-benzene | Red. |
| 40 | 1-amino-2,4-di-(4'-methoxyphenoxy)-benzene | Red. |
| 41 | 1-amino-2,4-diphenoxy-3-chloro-benzene | Red. |
| 42 | 1-amino-2,4-di-(4'-chlorophenoxy)-5-carbomethoxy-benzene. | Yellowish-red. |
| 43 | 1-amino-2-phenoxy-benzene-5-carboxylic acid phenylamide. | Bluish red. |
| 44 | 1-amino-2-phenoxy-benzene-5-carboxylic acid-(3',4'-dichlorophenylamide). | Red. |
| 45 | 1-amino-2-phenoxy-5-benzoyl-benzene | Yellowish red. |
| 46 | 1-amino-2,4-diphenoxy-5-benzoyl-benzene | Blueish red. |
| 47 | 1-amino-2-phenoxy-4-benzoyl-benzene | Red. |

EXAMPLE 48

3.2 g. of 2,5-dibenzoyl-1,4-benzoquinone and 6.0 g. of 1-amino-2,5-diethoxy-4-benzoylamino-benzene are refluxed for 1 hour in 50 ml. of nitrobenzene. The reaction mixture turns a red violet colour. The precipitate formed is filtered off and washed, first with ethanol and then with water. In this way, the triphenodioxazine dyestuff described in Example 12 is obtained in the form of green coloured crystals which have a metallic shimmer. The crystals dissolve in concentrated sulphuric acid in a blue colour.

EXAMPLE 49

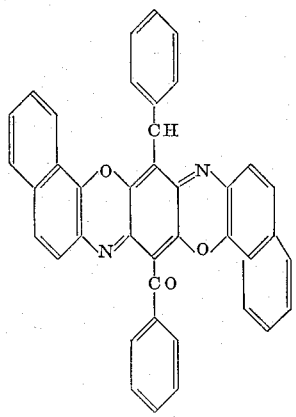

9.6 g. of 2,5-dibromo-3,6-dibenzoyl-1,4-benzoquinone, 5.8 g. of 2-aminonaphthalene and 0.9 g. of magnesium oxide are boiled for 5 hours in 200 ml. of ethanol. The pale brown coloured precipitate formed is filtered off under suction and washed with alcohol and water. After drying, 10.8 g. of 2,5-bis-[naphthyl-(2')-amino]-3,6-dibenzoyl-1,4-benzoquinone are obtained. This is boiled for 5 hours in 150 ml. of nitrobenzene. After cooling, the dyestuff formed is filtered off, washed with ethanol and water and dried. 5.2 g. of crystals are obtained which, after milling with salt, can be used as a blue pigment of good colour strength.

If, instead of the 5.8 g. of 2-aminonaphthalene, equivalent amounts of the amines given in the following Table VI are used and otherwise the procedure given in the above example is followed with the exception that 5 ml. of benzoyl chloride are used for ring closure, then pigments of similar structure are obtained having the shades given in the following table.

TABLE VI

| No. | Amine (Ar₂—NH₂) | Shade in printing paste |
|---|---|---|
| 50 | 1-aminonaphthalene | Violet. |
| 51 | 3,6-diamino-dibenzofuran | Bluish red. |

EXAMPLE 52

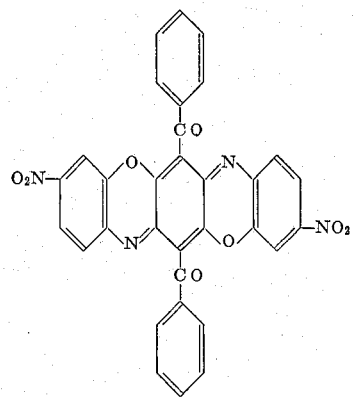

4.7 g. of 2,5-dibromo-3,6-dibenzoyl-1,4-benzoquinone, 3.3 g. of 1-amino-2-hydroxy-4-nitrobenzene and 1.7 g. of anhydrous sodium acetate are boiled in 100 ml. of glacial acetic acid. The triphenodioxazine dyestuff of the above formula is formed direct. After boiling for 7 hours, this dyestuff is filtered off hot, washed with alcohol and then with water and finally dried. 2.9 g. of dark red coloured crystals are obtained from which, after milling with a salt, a red brown pigment dyestuff is formed which has good colour strength.

EXAMPLE 53

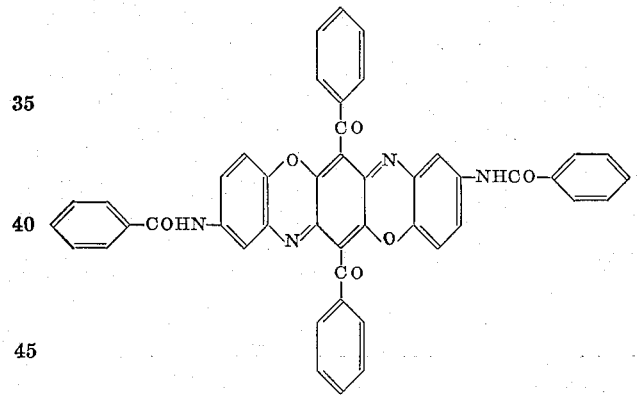

If in Example 1, the 4.2 g. of 1-amino-2,4-dimethoxy-5-chlorobenzene are replaced by 4.0 g. of 1-amino-2-methoxy-5-acetylamino-benzene and otherwise the procedure given in Example 1 is followed, then the dioxazine dyestuff of the above formula is obtained. After milling with a salt, e.g. sodium chloride or sodium sulphate, a red pigment is obtained with which lacquers can be coloured in red shades. These dyeings have good fastness to cross lacquering.

If, instead of the 4.0 g. of 1-amino-2-methoxy-5-acetylamino-benzene used in this example, equimolar amounts of the amines described in the following Table VII are used and if, in addition, in Examples 55 and 57, no benzoyl chloride is used, then triphenodiozazine dyestuff are obtained which have similarly good properties. Their shades in lacquers are given in column 3 of Table VII.

TABLE VII

| No. | Amine (Ar₂—NH₂) | Shade in lacquer |
|---|---|---|
| 54 | 1-amino-2-methoxy-4-benzoylamino-5-methyl-benzene. | Violet. |
| 55 | 1-amino-2-phenoxy-4-acetylamino-benzene | Red. |
| 56 | 4,4'-diamino-3,3'-dimethoxy-diphenyl | Blueish violet. |
| 57 | 1-amino-2-phenoxy-4-acetylamino-5-bromo-benzene. | Violet. |

EXAMPLE 58

8 g. of triphenodioxazine-9,10-dicarboxylic acid in 100 ml of o-dichlorobenzene are converted into the corresponding acid chloride with 50 ml. of thionyl chloride and a trace of phosphorus pentachloride and then the excess thionyl chloride is completely distilled off. The reaction mixture is diluted with 100 ml. of benzene and 25 g. of aluminum chloride are added at room temperature. The mixture is brought to the boil within 2 hours and kept at the boil for 3 hours. On completion of the Friedel-Crafts reaction, the reaction mixture is poured onto a mixture of ice water and hydrochloric acid. The precipitate formed is filtered off under suction, washed with alcohol, recrystallised from o-dichlorobenzene and dried. On milling with salt, the orange pigment dyestuff described in Example 31 is obtained.

The triphenodioxazine-9,10-dicarboxylic acid used in this example is produced in the following way: 16.4 g. of 2,5-dibromo-1,4-benzoquinone-3,6-dicarboxylic acid diethyl ester and 1-amino-2-methoxybenzene are boiled in 400 ml. of ethanol for 2 hours. The dianil compound formed is filtered off and dried.

20 g. of this dianil are added at a temperature of 70 to 80° to a mixture of 50 g. of aluminm chloride and 260 ml. of pyridine. The reaction mixture is slowly heated to 115° and kept at this temperature for 8 hours. After cooling, the mixture is poured into 400 ml. of 2 N hydrochloric acid, then 200 ml. of concentrated hydrochloric acid are added and finally the whole is diluted with water to 1000 ml. The pricipitate is filtered off and dried.

10 g. of the triphenodioxazine-9,10-dicarboxylic acid so produced are dissolved in 150 ml. of 80% sulphuric acid and the solution is heated for 15 hours at 80 to 90°. The deep blue solution is poured into 1000 ml. of water and the triphenodioxazine-9,10-dicarboxylic acid which precipitates is filtered off, washed with water and dried.

EXAMPLE 59

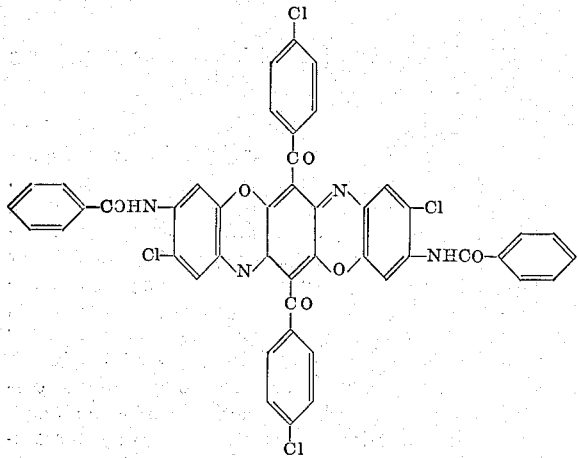

9.1 g. of 2,5-dichloro-3,6-di-(4'-chlorobenzoyl)-1,4-benzoquinone, 13.5 g. of 1-amino-2-phenoxy-4-benzoylamino-5-chlorobenzene and 0.9 g. of magnesium oxide in 200 ml. of ethanol are boiled for 6 hours. The 2,5-bis-(2'-phenoxy-4'-benzoylamino-5'-chloro-phenylamino)-3,6-di-(4'-chlorobenzoyl)-1,4-benzoquinone formed is separated by filtration while hot and the precipitate is washed with ethanol and water. After drying, 20.3 g. of a dark brown coloured product is obtained.

The ring of the dianil obtained is closed to form the triphenodioxazine by heating in 200 ml. of 1-chloronaphthalene. After refluxing for 2 hours under atmospheric pressure, the dioxazine formation is complete. The triphenodioxazine is filtered off hot and washed with acetone and water. After drying, 15.6 g. of triphenodioxazine dyestuff of the above formula are obtained in the form of green coloured crystals having a metallic shimmer. After milling the crystals with calcium chloride and working up the milled product in the usual way, a finely dispersed blueish red pigment dyestuff is obtained. Lacquer colourings of good colour strength are obtained therewith and they have very good fastness to cross lacquering and heat.

By repeating Example 59, but using instead of 9.1 g. of 2,5-dichloro-3,6-di-(4'-chlorobenzoyl)-1,4-benzoquinone an equivalent amount of the 2,5-dichloro-1,4-benzoquinones having in 3- and in 6-position the substituents given in the second column of the following Table VIII and using in lieu of the 13.5 g. of 1-amino-2-phenoxy-4-benzoylamino-5-chlorobenzene in the said example an equivalent amount of an amine $Ar_2-NH_2$ as listed in the third column of Table VIII, there are obtained the corresponding dioxazine pigments having similar high purity and colour strength as the dioxazine pigments described in the preceeding examples, which pigments impart to materials into which they are incorporated a shade as given in the last column of Table VIII.

TABLE VIII

| No. | 2,5-dichloro-1,4-benzoquinone having in 3,6-position the following substituents | Amine ($Ar_2-NH_2$) | Shade |
|---|---|---|---|
| 60 | 4-chlorobenzoyl- | 1-amino-2,4-dipropoxy-3-chlorobenzene. | Bluish red. |
| 61 | Benzoyl- | 1-amino-2,4-di-(phenylthio)-benzene. | Red. |
| 62 | 4-chlorobenzoyl- | 1-amino-2-phenoxy-4-acetylamino-5-chlorobenzene. | Red. |
| 63 | Benzoyl- | 1-amino-2-phenoxy-4-(2'-chlorobenzoylamino)-5-chlorobenzene. | Bordeaux. |
| 64 | do | 1-amino-2,4-di-(2'-methylphenylthio)-benzene. | Red. |
| 65 | 4-chlorobenzoyl- | 1-amino-2-phenoxy-4-(4'-methoxybenzoylamino)-5-chlorobenzene. | Bordeaux. |
| 66 | 4-phenlbenzoyl- | 1-amino-2,5-di-benzyloxy-4-benzoylaminobenzene. | Violet. |
| 67 | 4-chlorobenzoyl- | 1-amino-2,4-di-(4'-chlorophenoxy)-benzene. | Red. |
| 68 | Benzoyl- | 1-amino-2,5-dimethoxy-4-(N-phenylsulfamyl)-benzene. | Violet. |
| 69 | 4-(4'-chlorophenoxy)-benzoyl-. | 1-amino-2,5-di-(β-hydroxyethoxy)-4-benzoylaminobenzene. | Do. |
| 70 | Benzoyl- | 1-amino-4-phenylbenzene. | Bluish-red. |
| 71 | 4'-chlorobenzoyl- | 1-amino-4-(4'-chlorophenyl)-benzene. | Do. |
| 72 | 2,4-dimethylbenzoyl- | 1-amino-4-(4'-methoxyphenyl)-benzene. | Violet. |
| 73 | 2,4-dimethylbenzoyl- | 1-amino-2-methoxy-4-(3'-methoxy-4'-aminophenyl)-benzene. | Do. |
| 74 | Benzoyl- | 1-amino-2-methoxy-4-(3'-methoxy-4'-cyanophenyl)-benzene. | Do. |
| 75 | 4-chlorobenzoyl- | 1-amino-4-(4'-aminophenyl)-benzene. | Do. |
| 76 | 4-methylbenzoyl- | 1-amino-4-(4'-benzoylaminophenyl)-benzene. | Do. |
| 77 | 4-methoxybenzoyl- | 1-amino-2-methoxy-4-[3'-methoxy-4'-(4''-methylbenzoylamino)-phenyl]-benzene. | Do. |
| 78 | Benzoyl- | 1-amino-2-methoxy-4-[3'-methoxy-4'-(2''-chlorobenzoylamino)-phenyl]-benzene. | Do. |
| 79 | 2,4-dichlorobenzoyl- | 1-amino-2-methoxy-4-[3'-methoxy-4'-(4''-nitrobenzoylamino)-phenyl]-benzene. | Do. |
| 80 | 4-chlorobenzoyl- | 1-amino-2-phenoxy-4-(2'-chlorobenzoylamino)-5-chlorobenzene. | Red. |
| 81 | Benzoyl- | 1-amino-2,5-di-(4'-chlorobenzyloxy)-4-(4'-methylbenzoylamino)-benzene. | Violet. |
| 82 | 2,4-dichlorobenzoyl- | 1-amino-2,5-di-(2',4'-dimethylbenzyloxy)-4-(2'-chlorobenzoylamino)-benzene. | Reddish blue. |

TABLE VIII—Continued

| No. | 2,5-dichloro-1,4-benzoquinone having in 3,6-position the following substituents | Amine (Ar₂—NH₂) | Shade |
|---|---|---|---|
| 83 | 2,4-dichlorobenzoyl- | 1-amino-4-fluoro-benzene | Orange red. |
| 84 | Benzoyl- | 1-amino-4-trifluoromethyl-benzene. | Red. |
| 85 | do | 1-amino-2-phenoxy-5-carbamyl-benzene. | Red. |
| 86 | 4-chlorobenzoyl- | 1-amino-2-phenoxy-5-sulfamyl-benzene. | Red. |
| 87 | do | 1-amino-2-phenoxy-5-(N-isopropyl-carbamyl)-benzene. | Bluish red. |
| 88 | do | 1-amino-2-phenoxy-5-(N-ethyl-sulfamyl)-benzene. | Do. |
| 89 | Benzoyl- | 1-amino-2-phenoxy-5-(N-phenyl-sulfamyl)-benzene. | Violet. |
| 90 | do | 1-amino-2-phenoxy-5-[N-(2'-methylphenyl)-sulfamyl]-benzene. | Do. |
| 91 | do | 1-amino-2-phenoxy-5-[N-(4'-chlorophenyl)-sulfamyl]-benzene. | Do. |
| 92 | 4-chlorobenzoyl- | 1-amino-2-phenoxy-5-[N-(2',4'-dimethoxyphenyl)-sulfamyl]-benzene. | Do. |
| 93 | do | 1-amino-2-phenoxy-5-[N-(4'-methylphenyl)-carbamyl]-benzene. | Reddish violet. |
| 94 | 4-methoxybenzoyl- | 1-amino-2-phenoxy-5-[N-(3'-methoxyphenyl)-carbamyl]-benzene. | Violet. |
| 95 | 4-chlorobenzoyl- | 1-amino-2-methoxy-5-methylsulfonyl-benzene. | Reddish brown. |
| 96 | do | 1-amino-4-phenylsulfonyl-benzene. | Blueish red. |
| 97 | do | 1-amino-2-methoxy-5-(3'-chloro-4'-methoxy-benzoyl)-benzene. | Red. |
| 98 | Benzoyl- | 1-amino-2-methoxy-5-(3',4'-dimethylbenzoyl)-benzene. | Red. |
| 99 | 4-chlorobenzoyl- |  | Violet. |
| 100 | do | 1-amino-2,4-di-(4'-methylphenoxy)-5-chlorobenzene. | Do. |
| 101 | do | 1-amino-2,4-di-(2'-chlorophenoxy)-3-chlorobenzene. | Red. |
| 102 | 2,4-dichlorobenzoyl- | 1-amino-2,4-di-(4'-methoxyphenoxy)-3-chlorobenzene. | Violet. |
| 103 | 4-chlorobenzoyl- | 1-amino-2-phenoxy-3-chloro-4-(N-phenyl-carbamyl)-benzene. | Blueish |
| 104 | 4-bromobenzoyl- | 1-amino-2,4-di-(4'-bromophenoxy)-benzene. | Red. |

EXAMPLE 105

To produce a colour paste for printing inks, 2 g. of the pigment produced according to Example 29 which has been milled with salt are mixed and rubbed on a set of three mixing rollers with 36 g. of hydrate of alumina, 60 g. of linseed oil varnish of medium viscosity and 0.2 g. of cobalt linoleate. The reddish violet prints attained with this colour paste have a strong colour, are pure and have good fastness to light.

EXAMPLE 106

0.6 g. of the pigment produced according to Example 25 which has been milled with salt, are mixed on a set of mixing rollers for 10 to 35 minutes at 140° with 67 g. of polyvinyl chloride, 33 g. of dioctyl phthalate, 2 g. of dibutyl tin dilaurate and 2 g. of titanium dioxide. The red coloured polyvinyl chloride sheets attained therewith are fast to migration, heat and light.

EXAMPLE 107

10 g. of titanium dioxide, 35 g. of a 60% solution of a modified urea alkyd resin in xylene/butanol 1:1, 10 g. of terpentine oil and 5 g. of xylene are milled in a ball mill for 48 hours with 2 g. of the pigment produced according to the second paragraph of Example 24 or according to Example 13. If this coloured lacquer is poured onto aluminum sheets and stoved for 1 hour at 120°, then lacquerings are obtained which are distinguished by an excellently pure blue shade and very good fastness to light and cross lacquering.

We claim:

1. A triphenodioxazine pigment of the formula

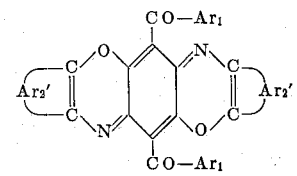

wherein both $Ar_1$ are identical members selected from the group consisting of: phenyl, fluorophenyl, chlorophenyl, bromophenyl, lower alkyl-phenyl, lower alkoxy-phenyl, diphenyl, phenoxyphenyl and halogenophenoxyphenyl wherein halogeno represents halogen of one of the atomic numbers 17 and 35, and both groupings

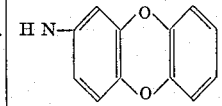

are identical members selected from the class consisting of:
(a) o-phenylene,
(b) o-phenylene substituted with the following: lower alkyl, lower alkoxy, hydroxy-lower alkoxy, phenyl, halogenophenyl, lower alkoxyphenyl, aminophenyl, cyanophenyl, benzoylaminophenyl, halogenobenzoylaminophenyl, lower alkyl-benzoylaminophenyl, nitrobenzoylaminophenyl, lower alkoxy-benzoylaminophenyl, benzyloxy, halogenobenzyloxy, lower alkyl-benzyloxy, phenoxy, halogenophenoxy, lower alkylphenoxy, lower alkoxy phenoxy, phenylthio, lower alkylphenylthio, fluoro, nitro, trifluoromethyl, amino, carbamyl, sulfamyl, N-mono-lower alkyl-carbamyl, N-mono-lower alkyl-sulfamyl, N-phenyl-carbamyl, N-phenyl-sulfamyl, N-(lower alkylphenyl)-sulfamyl, N-(halogenophenyl)-sulfamyl, N-(lower alkoxy-phenyl)-sulfamyl, N-(lower alkylphenyl)-carbamyl, N-(halogenophenyl)-carbamyl, N-(lower alkoxyphenyl)-carbamyl, lower alkoxy-carbonyl, lower alkylsulfonyl, phenylsulfonyl, benzoyl, halogenobenzoyl, lower alkylbenzoyl, lower alkoxy-benzoyl, lower alkanoylamino, benzoylamino, halogeno-benzoylamino, lower alkyl-benzoylamino, lower alkoxy-benzoylamino, 4,6-diphenyl-1,3,5-triazinyl-(2)-amino and lower alkoxy-carbonylamino,
(c) naphthylene-(1,2),
(d) benzofuryl-(3,4) and
(e) benzodioxinyl-(3,4).

2. A triphenodioxazine pigment of the formula

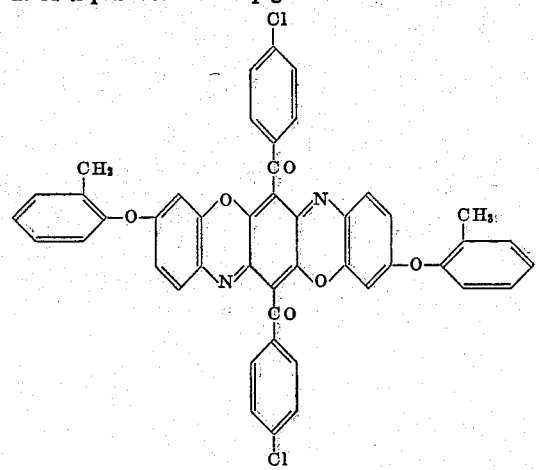

3. A triphenodioxazine pigment of the formula

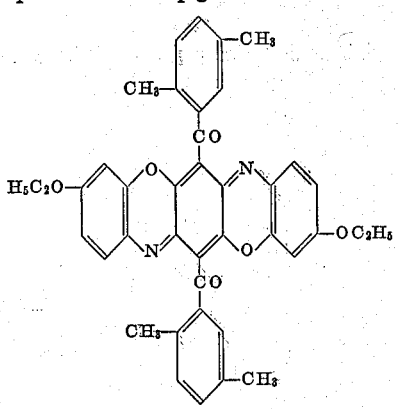

4. A triphenodioxazine pigment of the formula

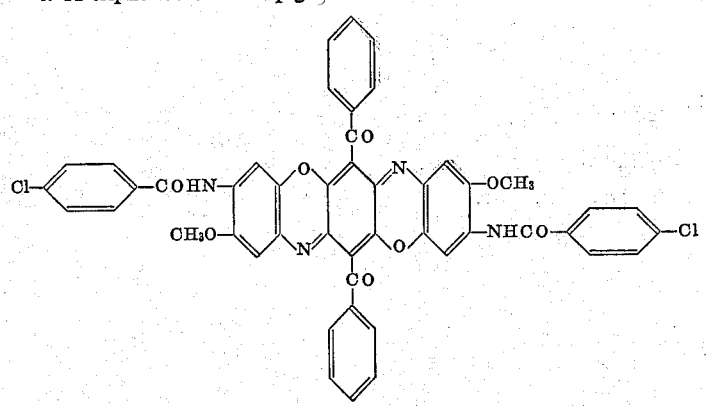

5. A triphenodioxazine pigment of the formula

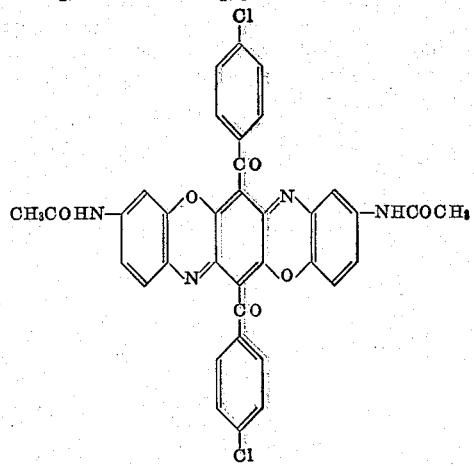

6. A triphenodioxazine pigment of the formula

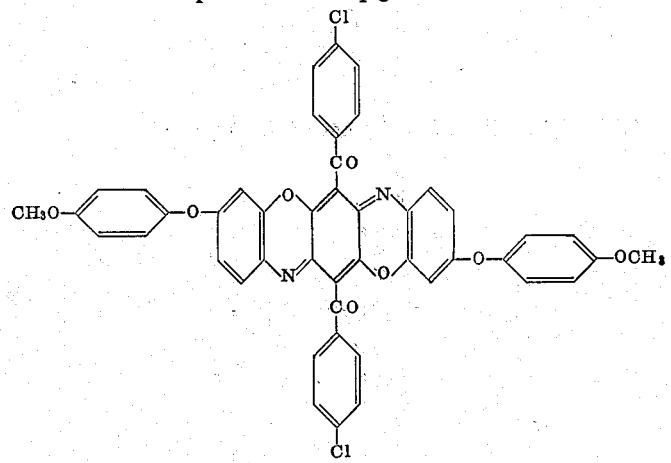

7. A triphenodioxazine pigment of the formula

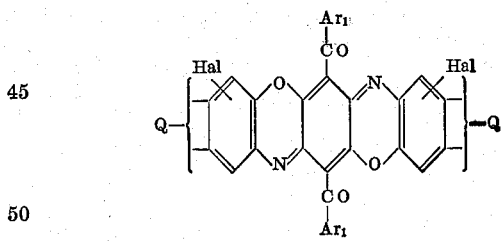

wherein both Ar₁ are identical members selected from the group consisting of: phenyl, fluorophenyl, chlorophenyl, bromophenyl, lower alkyl-phenyl, lower alkoxy-phenyl, diphenyl, phenoxyphenyl and halogenophenoxyphenyl wherein halogeno represents halogen of one of the atomic numbers 17 and 35, and both Q represent identical members selected from the group consisting of lower alkanoylamino, benzoylamino, lower alkyl benzoylamino, halogenobenzoylamino, lower alkoxy-benzoylamino, amino, lower alkoxy, phenoxy, halogenophenoxy, lower alkylphenoxy, lower alkoxyphenoxy and N-phenyl-carbamyl,
and Hal represents halogen of one of the atomic numbers 17 and 35.

8. A triphenodioxazine pigment of the formula

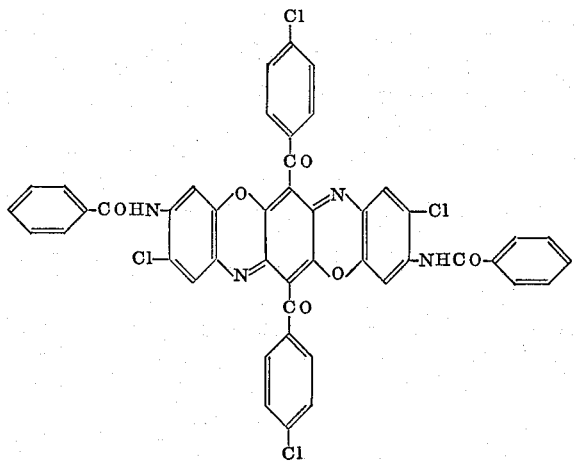

9. A triphenodioxazine pigment of the formula

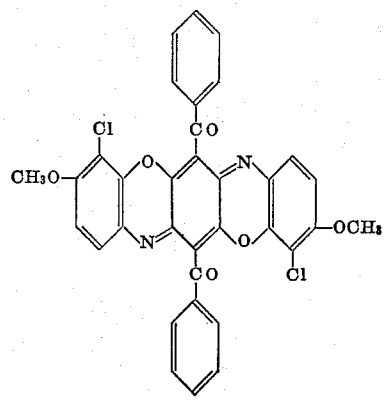

10. A triphenodioxazine pigment of the formula

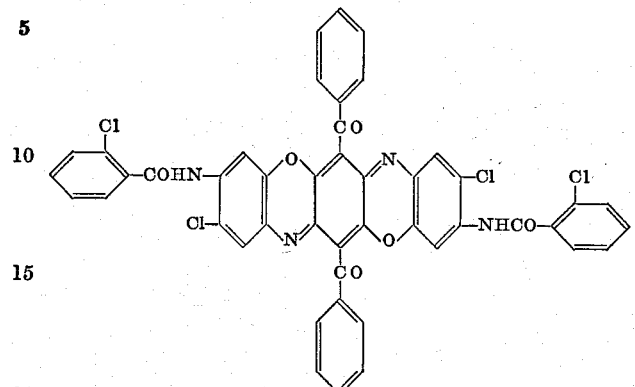

11. A triphenodioxazine pigment of the formula

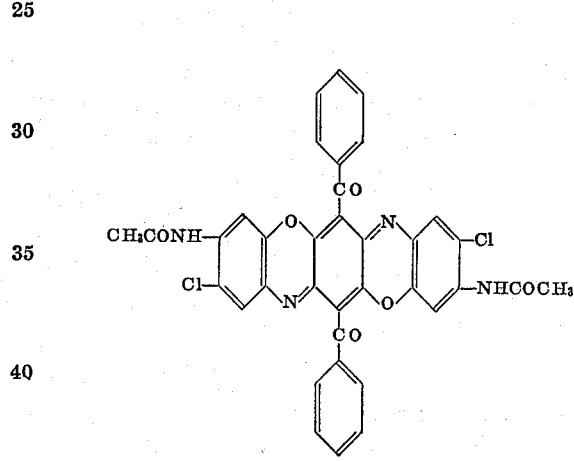

12. A triphenodioxazine pigment of the formula

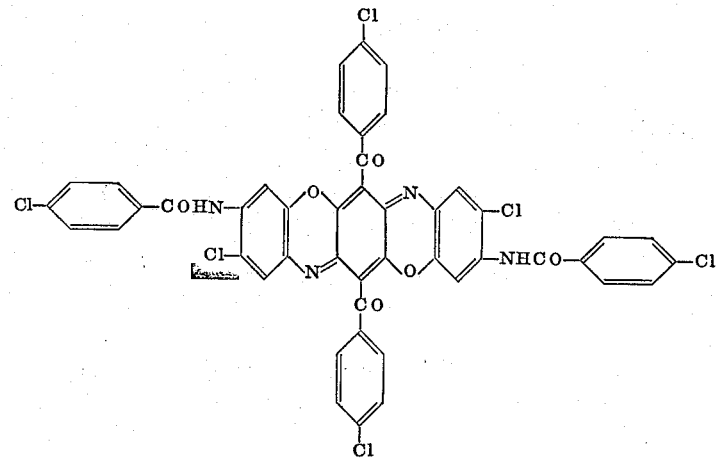

No references cited.

WALTER A. MODANCE, *Primary Examiner.*
ROBERT T. BOND, *Assistant Examiner.*